United States Patent [19]
Merle

[11] 3,931,676
[45] Jan. 13, 1976

[54] PORTABLE POWER SAW APPARATUS

[76] Inventor: William E. Merle, 15400 Bancroft Road, Auburn, Calif. 95602

[22] Filed: Feb. 11, 1974

[21] Appl. No.: 441,559

[52] U.S. Cl. .................. 30/371; 30/379; 83/745
[51] Int. Cl.² .................................. B27B 17/02
[58] Field of Search ........ 30/166 A, 371, 373, 381, 30/382, 383, 379, 370, 231; 56/244, 245, 290, 291, 292; 83/745

[56] References Cited
UNITED STATES PATENTS

| | | | |
|---|---|---|---|
| 2,698,034 | 12/1954 | Jakku | 30/371 |
| 2,765,822 | 10/1956 | Smith | 30/383 X |
| 3,097,430 | 7/1963 | Lewinski | 30/371 X |
| 3,680,607 | 8/1972 | Robinson | 83/745 |

FOREIGN PATENTS OR APPLICATIONS

| | | | |
|---|---|---|---|
| 1,004,415 | 3/1957 | Germany | 30/166 A |

Primary Examiner—Al Lawrence Smith
Assistant Examiner—J. C. Peters
Attorney, Agent, or Firm—Theodore J. Bielen, Jr.; Richard Esty Peterson

[57] ABSTRACT

A portable power saw apparatus is disclosed having an endless saw chain driven about a bow bar by an internal combustion engine. The apparatus includes a pair of transversely spaced legs respectively secured to the chain guide adjacent the outer end thereof and extending downwardly therefrom. The legs provide a ground-engageable abutment to support the outer end portion of the chain guide and saw chain, and they also define a size guage determinative of the largest diameter object acceptable between the legs for severance by the saw chain. Skid means secured to the handle structure of the apparatus is oriented at substantially the same elevation as the legs and forms a ground-engageable means therewith to support the saw apparatus in a generally horizontal orientation in certain operating modes.

5 Claims, 4 Drawing Figures

U.S. Patent  Jan. 13, 1976  3,931,676
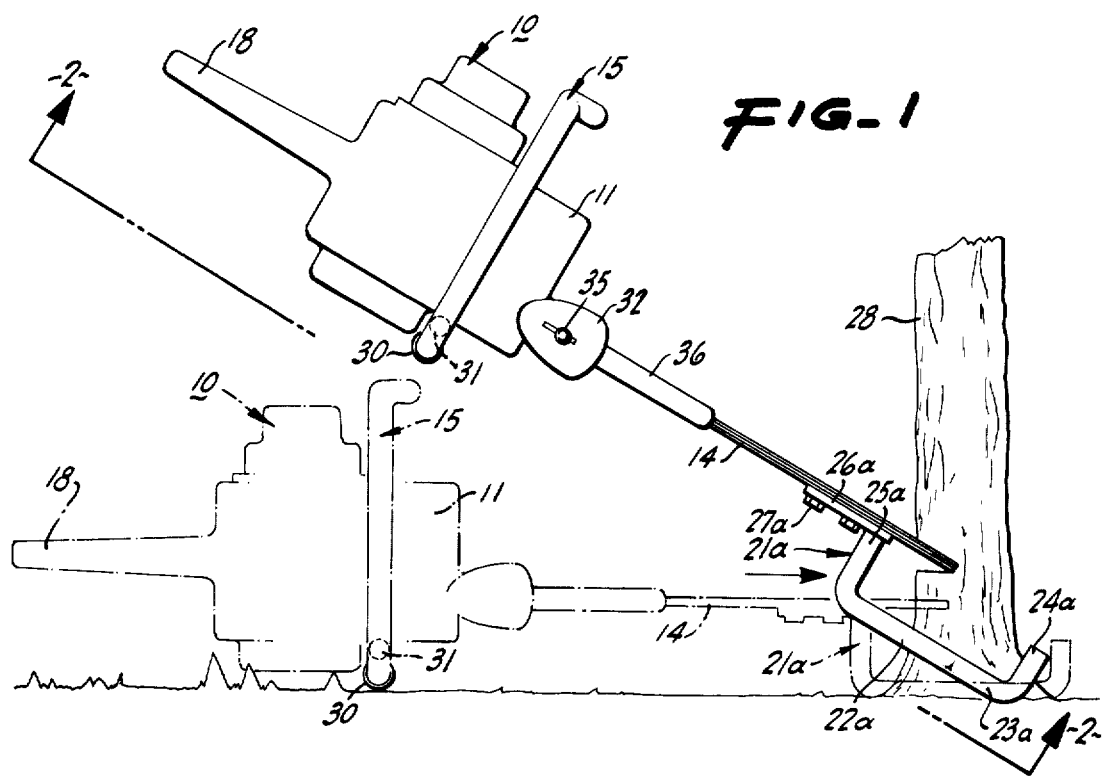
FIG.-1
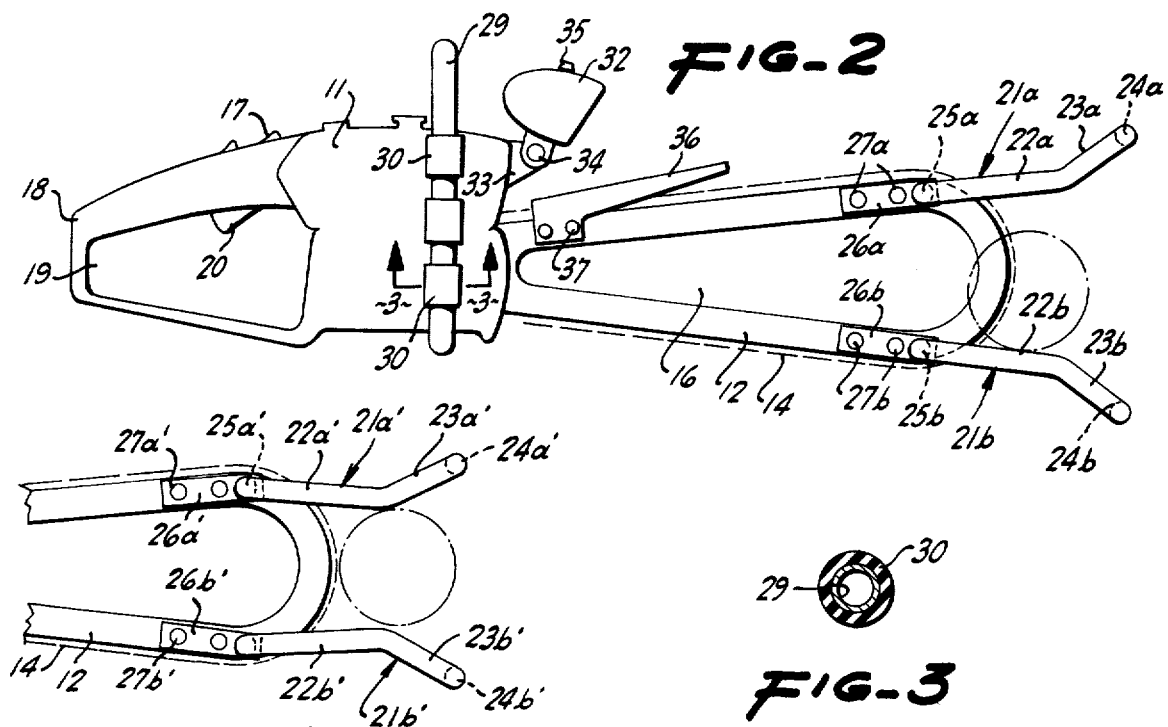
FIG.-2
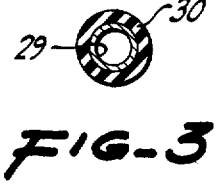
FIG.-3
FIG.-4

PORTABLE POWER SAW APPARATUS

This invention relates to a portable power saw apparatus and, more particularly, to an apparatus of the type equipped with means for protecting the endless power driven saw chain from damage.

The portable power saw apparatus includes a prime mover most frequently in the form of a gasoline engine. The engine is drivingly connected to an endless saw chain supported along the perimetric edge of a chain guide which extends from the casing of the saw in cantilever fashion. Whenever the engine is energized, the saw chain is driven continuously about the guide therefor, and the teeth of the chain can be moved into engagement with brush, trees, and similar objects to sever the same.

A saw apparatus of this type is used extensively in forestry and in fire fighting, although these instances of use are in no sense exhaustive. In the forestry application, the saw apparatus may be used for thinning in which case the brush and tree to be removed are advantageously cut in close proximity to the ground level. Similarly, in using a saw apparatus on a fire line, the brush and trees are advantageously cut close to the ground so as to minimize the amount of combustible material remaining. In either instance, it is very common for the saw chain to be dulled and damaged by inadvertent engagement with rocks and with the abrasive soil as by being pushed into a hillside or slight rise along the ground level. The resultant damage to the teeth of the saw chain necessitates frequent sharpening of the teeth and often very deep or extensive sharpening which, evidently, removes substantial amounts of metal from the teeth. In fact, it has been estimated that at least 90 percent of the wear along the teeth of a saw chain is a consequence of the sharpening to which the teeth are subjected between the period when the saw chain is first placed on the saw apparatus and when it must be discarded because of wear.

Further, whenever the saw chain is pushed inadvertently into a hillside, rocks, etc., an abnormal load is imparted to the saw chain which can prove hazardous by jerking or otherwise imparting unusual stress to the operator. Such occurrences together with the weight of the saw apparatus requires that the operator support the same in both hands, thereby often preventing him from warding off falling brush, small trees, and other debris being severed by the saw apparatus. The resultant attention that the operator must pay to the material being severed makes it very difficult for him to remove his eyes therefrom should he be momentarily distracted.

In view of the foregoing, an object of the present invention is to provide an improved portable power saw apparatus that obviates or minimizes many of the disadvantages and limitations inherent in prior art mechanisms.

Still another object is in the provision of an improved saw apparatus of the character described in which both the replacement costs of saw chains and the down time required for sharpening are significantly reduced, chain costs being reduced by as much as 80 percent (typical chain costs today approximate $40.00 for each replacement chain) and down time for sharpening to about the same order of magnitude (the saw apparatus may be used continuously for an eight hour shift without sharpening being required whereas sharpening often is required from two to four times and often more in an eight hour shift in conventional apparatus, depending upon the particular soil and brush conditions).

Yet another object is that of providing an improved chain saw apparatus as described in which positive means are included to protect the saw chain from being advanced into rocks, soil, etc.; and in which the operator of the apparatus is able to rest at least a portion of the saw weight on the ground so that he is subjected to much less fatigue and therefore is capable of greater production.

Further objects, among others, of the present invention are to provide a portable power saw apparatus having the features and characteristics discussed, and in which cutting is effected equally well from above, below, or on the sides so that an operator may approach a tree or brush directly and thereby minimize the operator's requirement for lateral movement or "walk around"; in which brush and trees may be cut at ground level by the operator laying the saw apparatus in a generally horizontal disposition along the ground and then pushing it forwardly beneath overhanging limbs and debris; in which a timber stand may be thinned with substantially improved accuracy as respects tree sizes and as an automatic function by means of a size guage forming a part of the improved apparatus, and which size gauge may be adjustably interchanged to provide selection over the tree sizes selected for cutting; in which safety is enhanced by reducing operator fatigue and enabling him to remove his eyes safely, although momentarily, from the particular cutting area should he be distracted; and in which various aids and protective arrangements are included to facilitate use of the apparatus.

Additional objects and advantages of the invention, especially as concerns particular features and characteristics thereof, will become apparent as the specification continues.

In general summary form, the improved saw apparatus embodying the present invention is equipped with leg means secured to the chain guide of the apparatus adjacent the outer end portion thereof to extend both laterally and forwardly therefrom and provide a ground-engageably abutment in at least one operative position of the saw apparatus to support the outer end portion of the chain guide and saw chain during at least certain cutting operations. Such leg means may include a pair of transversely spaced legs that define a size gauge determinative of the largest diameter object accepted between the legs for severance by the saw chain. The legs are adjustably or interchangeably related to the chain guide to enable the size gauge to be changed when desired. Skid means carried by the casing assembly of the saw apparatus on the same side thereof as the legs are cooperative with the later to support the saw apparatus in a generally horizontal orientation. A light is included to enable the material being severed to be illuminated for more clear observation.

Embodiments of the invention are illustrated in the accompanying drawing, in which:

FIG. 1 is a side view in elevation of saw apparatus embodying the present invention oriented in one cutting mode, an alternate position of the apparatus being shown in broken lines;

FIG. 2 is a bottom plan view of the apparatus taken along the line 2—2 of FIG. 1;

FIG. 3 is an enlarged longitudinal sectional view taken along the line 3—3 of FIG. 2; and FIG. 4 is a broken bottom plan view, similar to that of FIG. 2, but illustrating a modified apparatus.

The portable power saw apparatus illustrated in the drawing is, for the most part, substantially conventional, and the particular apparatus shown is denoted in its entirety with the numeral 10. The saw apparatus 10 includes a casing assembly 11 having a chain guide 12 extending longitudinally therefrom. The guide 12 is traversed along the edges thereof by an endless power-driven saw chain 14, and a handle structure 15 secured to the casing assembly 11 enables the apparatus to be handheld and manipulated.

The chain guide 12 extends longitudinally from the casing assembly 11 in cantilever fashion so as to be supported only at the inner end thereof. The chain guide is sometimes referred to in the art as a "bar," and in the particular form shown is a "bow bar" forming a continuous perimetric edge defining an open center portion 16, as shown best in FIG. 2. The bow bar enlarges outwardly from the casing assembly 11 to provide a relatively large arc traversed by the chain 14 to form a substantial cutting segment thereat. The chain 14 is necessarily endless since it travels continuously along the edge of the chain guide 12, and it is driven by means provided for this purpose within the casing assembly 11. The chain, as is well known, constitutes a plurality of successive links pivotally interconnected one with another and provided with cutting edges adapted to cut trees, logs, and similar articles, as illustrated in FIG. 1.

Respecting driving power imparted to the chain 14, any suitable prime mover may be used for this purpose, and in the saw apparatus 10, the prime mover takes the form of an internal combustion engine and specifically, a gasoline engine generally of the two-cycle type sufficiently small and lightweight to enable the apparatus 10 to be handheld and manipulated with reasonable facility. The apparatus 10 therefore has the usual engine controls including an electric on-off switch 17 located along a handle section 18 extending from the casing assembly 11 in a longitudinal direction opposite that of the bow bar 12, as is apparent in both FIGS. 1 and 2. The handle section 18 is a closed component having a relatively large opening 19 therewithin adapted to have the fingers of a workman pass therethrough, and a finger-manipulatable throttle control 20 is disposed within the opening 19 to enable a workman to have continuous control over the velocity of the engine and, therefore, the rate of linear movement of the saw chain 14.

It may be observed that as respects the saw apparatus 10 as heretofore described, it may be completely conventional, therefore requiring no further specific details pertaining to its structural and operational features and characteristics. By way of a specific example, the saw apparatus 10 may be a McCulloch Super Pro 80 manufactured by the McCulloch Corporation of Los Angeles, Calif.

The saw apparatus 10 is equipped with a leg extending laterally from the chain guide 12 adjacent the outer end portion thereof remote from the casing assembly 11. The leg provides a ground-engageable abutment to at least one operative position of the saw apparatus to support the outer end portion of the chain guide and saw chain during certain cutting operations. In the particular form of the invention being considered, a pair of such legs are included, and they are symmetrically disposed with respect to the longitudinal axis of the chain guide 12, as is most apparent in FIG. 2. Such legs are respectively denoted with the numerals 21a and 21b. As previously suggested, the legs 21 are equally spaced from the longitudinal axis of the chain guide 12 to which they are respectively secured in transversely spaced relation adjacent the outer end portion thereof. The legs 21 extend forwardly from the chain guide, as is most evident in FIG. 2, and they define a size gauge determinative of the largest diameter object accepted between the legs for severance by the saw chain 14.

The legs 21 are quite similar structurally and are essentially identical except that they diverge from the axis of the chain guide 12 adjacent their outer end portions. In this respect, each of the legs is generally U-shaped in a longitudinal direction, as is evident in FIG. 1, and it has a ground-engageable intermediate length or section 22 (the suffixes a and b being used in respective association with the legs 21a and 21b for purposes of differentiation), an outer transversely turned section or length 23 terminating in a laterally turned (i.e., toward the plane of the chain guide 12) outer end 24, and a laterally turned inner end 25 generally paralleling the end 24. The end 25 is somewhat longer than the end 24, and it determines the spacing between the plane of the chain guide 12 and ground-engaging sections 22 and 23 which essentially parallel the same. The inner leg 25 at the end thereof is welded or otherwise fixedly secured to a mounting plate or bracket 26 that is secured to the chain guide 12, as by means of a plurality of nut and bolt assemblies 27. It is apparent, then, that the legs 21a and 21b are substantially identical except that the end portions 23a and 23b thereof diverge and therefore project in opposite directions from the longitudinal axis of the chain guide 12.

The legs 21 may be adjustable for the purpose of changing the size of the spacing defined therebetween which will have the effect of controlling the size of the object permitted to be engaged by the saw chain 14. Various arrangements may be provided to accommodate such adjustability of the legs, and in the particular form of the invention being considered, the legs 21 are removably secured to the chain guide 12 by means of the aforementioned nut and bolt assemblies 27. Accordingly, the legs 21a and 21b may be removed from the saw apparatus 10, and replaced with legs having a different spacing therebetween. More particularly, the ground-engaging sections 22a and 22b of the legs, as seen most clearly in FIG. 2, extend in generally parallel relation with the respective diverging edges of the chain guide 12. Therefore, the spacing between the sections 22a and 22b adjacent the outer termini thereof approximates the transverse dimension of the arcuate end portion of the chain guide. The diverging sections 23a and 23b simply establish a relatively wide mouth to facilitate movement of material into the space between the legs for engagement by the saw chain 14. Referring to FIG. 4, it will be seen that the legs 21a and 21b have been replaced, respectively, by legs 21a' and 21b'. These alternative legs 21' differ from the aforementioned legs 21 in that the ground-engaging sections 22a' and 22b' thereof do not diverge (i.e., generally parallel the respectively associated edges of the chain guide 12), but tend to generally parallel each other and actually converge slightly, thereby defining a more restricted space between the legs 21' than the space defined between the legs 21.

Except for the differences noted, the modified legs 21' are essentially identical to the legs 21, and no further description thereof will be included. The respectively corresponding components, however, are denoted with the primed form of the same numerals used to identify the various elements of the legs 21. The chain guide 12 illustrated in FIG. 4 may be the same chain guide 12 previously described and illustrated in FIGS. 1 and 2 so that it need not be further described.

It will be apparent that the saw apparatus 10 may be advanced toward the stem of a small tree or treeling 28, as illustrated in FIG. 1, to pass the stem intermediate the spaced legs and thereby bring the saw chain 14 into severing engagement with the tree stem. Since the legs must accept the stem therebetween before the saw chain is able to engage the stem, it will be appreciated that the spacing defined between the legs determines the maximum size of any tree stem that can be cut by the saw apparatus. Therefore, the legs provide a size gauge effective to select automatically the tree size to be cut, thereby removing from the workman the requirement for conscious size selection. As previously explained, the size gauge can be changed selectively as by replacing the legs 21 with the legs 21' (or other pairs of legs having different spacings therebetween) so that the size selection effected automatically by the apparatus can be tailored to the requirements of any cutting operation.

The saw apparatus 10 is further equipped with skid means supported by the casing assembly 11 along the same side of the apparatus and chain guide 12 as the legs 21 for ground-engagement therewith. In the form shown, a support 29 is secured to the casing assembly to provide a ground-engageable element disposed along the same side of the apparatus and chain guide as the legs 21. The support 29 is equipped with the aforementioned skid means (denoted with the numeral 30) to protect the same during ground-engagement thereof. The support 29 in the form shown is substantially integral with the handle structure 15, and it extends along the casing assembly 11 on one side thereof. The support 29 is spaced from the adjacent surface of the casing assembly 11, and a handle component 31 formed integrally with the handle structure 15 is interposed between the casing assembly and support. As shown best in FIG. 1, the lower extremity of the skid means 30 and lower surface of the legs 21 are in a generally coplanar relationship so that the bow bar 12 is disposed in a substantially horizontal orientation when the skid means 30 and leg sections 22 are in ground-engaging position.

As illustrated best in FIGS. 2 and 3, the skid means 30 constitute a plurality of individual roller-like sleeves of hollow cylindrical configuration that are coaxially circumjacent the hollow tubular support 29. The sleeve-type skid means may be formed from various materials, and a specific example is one of the durable synthetic plastics such as polyvinylchloride. It is usually unnecessary for the skid sleeves to be freely rotatable with respect to the support 29, and they may be fixedly located thereon via a frictional grip.

The saw apparatus 10 is further equipped with an electric light 32 mounted on the casing assembly 11 via bracket structure 33 having an adjustable hinge 34 intermediate the ends thereof to enable the orientation of the light 32 to be adjusted so as to illuminate the particular part of the saw chain 14 being used for cutting at any particular time. The light 32 is a conventional, self-contained, battery-energized light source with the bulb and battery being located within the casing of the light. An on-off switch 35 enables the light to be manually manipulated. The bracket structure 33 is conventional, and the hinge 34 includes the usual clamp to tighten the relatively movable sections of the bracket structure into tight frictional engagement to preserve any position of adjustment selected for the light.

As shown best in FIG. 1, the light 32 is disposed in general alignment with the saw chain 14, and a safety guard 36 is located intermediate the light 32 and underlying section of the saw chain 14 to shield the light and to protect the hands of one that may manipulate the light when the saw chain is being driven. As seen in FIG. 2, the guard 36 is secured to the chain guide 12 by a plurality of fasteners 37 in the form of nut and bolt assemblies, and the guide is enlarged at its inner base end to enable such connection thereof with the chain guide. The guard is therefore supported in cantilever fashion, and it extends forwardly along the chain and diverges slightly therefrom.

For the most part, the saw apparatus 10 is usuable in a conventional manner but with the advantages and facility resulting from the inventive changes introduced thereinto. Accordingly, the saw apparatus may be oriented in the cutting mode depicted in FIG. 1 in which the legs 21 face downwardly for ground-engagement. Similarly, the apparatus 10 may be oriented in the position shown in FIG. 2 in which the legs 21 extend to one side, rather than downwardly, and the section of the saw chain 14 then used to effect severance is the relatively long stretch thereof projecting from the casing assembly 11 toward the leg 21b. Evidently, in either operating mode of the saw apparatus 10, the segment of the saw chain intermediate the legs 21 or the longer segment thereof intermediate the casing assembly and leg 21b may be used to engage and cut brush, small trees, etc. The short chain segment outwardly from the guard 36 may also be used to engage and cut material.

The usual operating procedure is for the workman to hold the saw apparatus by means of the handle structure 15 and handle section 18 in both of the operating modes respectively shown in FIGS. 1 and 2, and to move the selected cutting section of the saw chain 14 into engagement with the material to be severed. In the absence of the legs 21, the workman must support the chain guide 12 and saw chain 14 above the surface of the ground for the purpose of protecting the saw chain from rocks, abrasive soil, and similar matter that is very destructive of the saw blade. In the presence of the legs 21, and particularly in the operating mode of the apparatus shown in FIG. 1, the saw chain 14 is automatically protected from ground engagement thereby alleviating this operator requirement and also reducing the load that the workman must support because a part of the weight of the saw apparatus may be carried on the legs 21. In this respect, it is often possible for the operator to use the saw apparatus by supporting the same with one hand as he protects himself with his other hand and arm by catching and pushing severed trees and brush away from him.

In certain instances, it may be desirable and advantageous to support the saw apparatus 10 on the legs 21 and skid means 30, as shown by broken lines in FIG. 1. Especially in this case, but any time that the legs 21 are in ground-engagement, the brush and/or small trees severed by the saw apparatus will all be cut at the same elevation with respect to the ground surface. The go-no go or size guage characteristics of the legs 21 have been explained which is very convenient for use in forest thinning. The legs may also be interchanged not only for size guage purposes but also to provide a different cutting elevation with respect to the ground surface. That is to say, the legs 21 may be exchanged for counterpart legs in which the inner ends 25 thereof are either longer or shorter than those shown in FIG. 1 to enable the saw chain 14 to be either disposed more remote or more proximite to the ground surface during a cutting operation. The skid means 30 support the casing assembly 11 at an elevated position and protect both the casing assembly and support 29 from abrasion whenever the saw apparatus is in the horizontal operating mode depicted by broken lines in FIG. 1. The light 32 is useful especially at night to illuminate the object being engaged and cut by the saw chain 14. As previously noted, the guard 36 both shields the light 32 and protects the hands of one manipulating the same during operation of the saw apparatus.

The legs 21 protect the saw chain from being lowered into ground engagement and from being pushed forwardly into a hill or rise, thereby protecting the cutting teeth of the saw chain from damage. As previously indicated, this extends the life of the chain very significantly because in the absence of such misuse or accidental use of the saw chain, it remains sharp for longer periods, thereby obviating the requirement for frequent and expensive sharpening which has been estimated to account for of the order of 90 percent of chain wear. As an example, in the average use of saw apparatus of the type being considered, it may be in actual operation for up to eight hours a day. With such use, the saw chain 14 in the absence of the present invention will have a useful life of about one week. In being protected by the legs 21, the saw chain 14 is able to be used for up to one month without being replaced because the only requirement for sharpening is "touch-up" sharpening to take care of ordinary wear in contradistinction to the extensive and frequent sharpening required to take care of damaged teeth that have engaged earth, rocks, and similar debris.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A portable power saw apparatus having in combination a casing assembly, a chain guide extending longitudinally therefrom and transversed along the edges thereof by an endless power driven saw chain, and a handle structure enabling said apparatus to be handheld and manipulated the improvement comprising: a pair of legs secured to the chain adjacent the outer end-portion thereof remote from the casing assembly and extending laterally from the guide, said legs disposed in transversely spaced relation to define a size guage determinative of the largest diameter object accepted between said legs for severance by the chain saw, said legs' end portions forming a wide mouth to facilitate movement of severable objects through the spaces defined between said legs and into engagement with said saw chain, said legs providing a groundengageable abutment in at least one operative position to support the outer end portion of the chain guide and saw chain and protect the same from groundengagement during certain cutting operations.

2. The apparatus of claim 1 in which said legs are removably secured to the chain guide to enable said legs defining variant sized gauges to be interchangeably associated with said apparatus.

3. The apparatus of claim 1 which additionally comprises an electric light means secured to said casing assembly and oriented to direct a beam of light toward said legs.

4. A portable power saw apparatus in accordance with claim 1 in which the chain guide comprises a pair of transversely spaced diverging members extending longitudinally and forwardly from the casing assembly and haing an arcuate bent portion connecting the forward ends of the diverging members, the chain saw being guided along the outer edges of the members and of the arcuate connecting portion, said legs secured to an extending forwardly and divergently from said members and beyond the arcuate connecting portion, and the portion of the legs, extending beyond the arcuate connecting portion of the diverging members being laterally spaced from said members.

5. The apparatus of claim 1 in which each of said legs is generally U-shaped, extending laterally from said chain guide in one direction, forwardly therefrom, and then laterally in the opposite direction.

* * * * *